United States Patent
Bennis et al.

[11] Patent Number: 5,844,564
[45] Date of Patent: Dec. 1, 1998

[54] METHOD FOR GENERATING A 3D-GRID PATTERN MATCHING THE GEOMETRY OF A BODY IN ORDER TO ACHIEVE A MODEL REPRESENTATIVE OF THIS BODY

[75] Inventors: Chakib Bennis, Rueil-Malmaison; William Sassi, Fourqueux, both of France

[73] Assignee: Institute Francais du Petrole, Rueil-Malmaison, France

[21] Appl. No.: 833,999

[22] Filed: Apr. 11, 1997

[30] Foreign Application Priority Data

Apr. 12, 1996 [FR] France .................................. 96 04567

[51] Int. Cl.$^6$ .................................................. G06T 17/20
[52] U.S. Cl. .............................................................. 345/423
[58] Field of Search .................................... 345/419, 420, 345/421, 423

[56] References Cited

U.S. PATENT DOCUMENTS

| | | | |
|---|---|---|---|
| 5,038,291 | 8/1991 | Wang et al. | 345/420 |
| 5,189,626 | 2/1993 | Colburn | 345/420 |
| 5,333,248 | 7/1994 | Christensen | 395/142 |
| 5,345,490 | 9/1994 | Finnigan | 345/420 |
| 5,465,323 | 11/1995 | Mallet | 345/420 |
| 5,542,030 | 7/1996 | Gutfinger | 345/423 |
| 5,617,322 | 4/1997 | Yokota | 345/420 |
| 5,627,949 | 5/1997 | Letcher, Jr. | 345/420 |

FOREIGN PATENT DOCUMENTS 95-30209  11/1995  WIPO .

OTHER PUBLICATIONS

COMPUTERS & GEOSCIENCES, vol. 20, No. 9 (Nov. 1994), pp. 1379–1390, by Renard P et al entitled "Three–Dimensional Geometric Modeling of a Faulted Domain: The Soultz Horst Example (Alsace, France)".
COMPUTER AIDED DESIGN, vol. 24, No. 4, (1 Apr. 1992), by J–L Mallett, entitled "Discrete Smooth Interpolation in Geometric Modelling".

*Primary Examiner*—Almis R. Jankus
*Assistant Examiner*—Huedung X. Cao
*Attorney, Agent, or Firm*—Antonelli, Terry, Stout & Kraus, LLP

[57] ABSTRACT

The invention is a method applicable to a geologic structure, such as an oil bearing reservoir, defined from available data acquired either through measurements or through analyses and interpretations of seismic data or loggings performed in wells. The invention comprises previous modeling of the boundaries (zone edges, discontinuities or faults for example) by of triangulated surfaces enveloping as far as possible these boundaries and splitting up of the zone studied into blocks having at most six faces, whose faces correspond to discontinuities or main faults of the zone previously triangulated. Each block is thereafter subdivided into a set of elementary cells necessary for modeling the zone by finite elements or differences, by performing a gridding of each of the faces of the block by interpolation from the edges thereof so as to obtain a grid, followed by populating each block with nodes in the thickness thereof, by interpolation from the nodes of the various grids formed on the various faces, these operations being accompanied by particular homogenization procedures in order to readjust the size of the cells within each block according to predetermined rules. The gridded blocks are thereafter reassembled.

18 Claims, 16 Drawing Sheets

METHOD FOR GENERATING A 3D-GRID PATTERN MATCHING THE GEOMETRY OF A BODY IN ORDER TO ACHIEVE A MODEL REPRESENTATIVE OF THIS BODY

BACKGROUND OF THE INVENTION

1. Field of the Invention

The present invention relates to a method for generating a 3D-grid pattern in order to model any body whose geometry is known and imposed a priori, such as for example a geologic structure, by taking its geometry accurately into account in all its natural complexity. The gridding is in the case of a geologic structure, with the position of the interfaces between the layers, with the faults, even of complex shape, the pinchouts and other structure irregularities, achieved by representing them with their real conformation.

2. Description of the Prior Art

Modeling of a geologic structure is achieved from a set of available data acquired either during measurements or through analyses and interpretations of seismic data or loggings performed in wells. These data take the form of a cluster of points between which a grid pattern has to be installed. The formation of a 3D-grid pattern plays a crucial part for numerical simulations in various geologic applications. A significant amount of research has been carried out into this subject, mainly in reservoir engineering because of its applications in the petroleum field.

There are many well-known 3D-gridding techniques for numerical simulations by finite elements or differences and sets of simulation softwares created for the implementation thereof, that are suited to applications and meet predetermined constraints.

It is well-known for some applications to use non-structured tetrahedral type grid patterns. It is also well-known to achieve a hexahedral skin or surface gridding and to distribute points in the grid pattern either by transfinite interpolation or by solving partial differential equations. The surfaces are generally created from parametric functions and the grid points are simply obtained by sampling these functions. Such a method is generally not suitable for geoscience applications where the volumes to be modeled most often have very complex shapes difficult to render with parametric functions in view of the precision desired. Complex shapes are therefore preferably approached by means of triangulated surface elements.

Various gridding techniques applied to reservoir modeling are described for example in:

Georges P. L.: "Génération Automatique de Maillages", Editions Masson, 1991;

Guérillot D. R. et al: An interactive 3D Mesh Builder for Fluid Flow Reservoir Simulation, in SPE - Computer Applications, Dec. 1993;

Aziz K.: Reservoir Simulation Grids : Opportunities and Problems, SPE - JPT, July 1993, or Heineman Z. E. et al: Gridding Techniques in Reservoir Simulation, Intl Forum on Reservoir Simulation, Alpbach Austria, Sep. 12–16, 1988.

However, most of the well-known gridding techniques and therefore the resulting simulations are suitable only for modeling relatively simple geologic structures. The geologic irregularities common in modeled reservoir zones, such as layers having great thickness variations, faults or pinchouts, are rarely taken into account or only in a greatly simplified way. In gridded models obtained within the scope of geosciences, the faults appear vertically; at best, they are inclined and plane. Now, it is important to render accurately the 3D geometry of the sediments since they have their own physical characteristics, as well as the geometry of the faults and other mechanical discontinuities.

SUMMARY OF THE INVENTION

The method according to the invention allows generation of a 3D-grid pattern matching the geometry of a zone of a complex environment whose geometry is known and imposed a priori, such as a geologic structure, in order to achieve a model representative of this environment. The structure is defined from available data acquired either by measurements or by analyses and interpretations of seismic data or loggings achieved in wells. It comprises previous modeling of the boundaries (zone edges, discontinuities or faults for example) by means of triangulated surfaces, enveloping as far as possible these boundaries, and splitting up of the zone studied into blocks having at most six faces, whose faces correspond to discontinuities or main faults of the zone previously triangulated.

The method of the invention comprises subdividing each block into a set of elementary cells necessary to model the zone by finite elements, through a 3D reticulation of each of the various blocks obtained, a subdivision that includes:

a) gridding of each of the faces of the block by interpolation from the edges thereof, so as to create an intermediate grid, followed by a projection on the triangulated surface of the nodes of this intermediate grid in a predetermined direction (perpendicular to itself for example);

b) populating each block with grid nodes in the thickness thereof, by means of an interpolation method from the nodes of the various grids formed on the various triangulated faces of each block, and c) rearrangement in the positioning of the nodes of the elementary cells created, obtained (generally iteratively) by relaxation in the positioning of the nodes, according to predetermined criteria such as the regularity, the selection of the relative size of the various cells and the mode of progression of the size thereof, the direction of projection, etc.

Each block being thus reticulated in 3D, all of the blocks can be reassembled or restacked.

It is possible to perform successively a first operation of relaxation in the positioning of the nodes on each of the various triangulated faces, populating with internal nodes being carried out from the relaxed grids, then a second operation of relaxation in the positioning of these internal nodes.

The first relaxation operation is preferably performed by means of iterative relaxation-projection stages.

The method according to the invention allows the obtaining of a model that matches very accurately the often complex geometry of geologic structures such as oil-bearing fields, so that the simulations that can be performed from this model take into account the phenomena more accurately. The method used also allows to saving a significant amount of calculating time for achieving 3D gridding operations that are usually very long with the existing methods.

The method according to the invention has applications notably for modeling in rock mechanics, for the characterization of reservoirs, sediment layers, stratigraphy, and also for the simulation of flows in basins and reservoirs.

BRIEF DESCRIPTION OF THE DRAWINGS

Other features and advantages of the method according to the invention will be clear from reading the description hereafter of embodiments given by way of non limitative examples, with reference to the accompanying drawings in which.

DESCRIPTION OF THE INVENTION

The large-size geologic structure illustrated by FIGS. 7–10 corresponds to an anticlinal dome comprising six interfaces between sediments.

The 3D gridding by finite elements of a zone from a set of initial data known for the zone : interfaces between various layers or horizons, main faults, and contour maps with well locations is performed by means of a succession of stages that are described hereafter.

Figure 7:
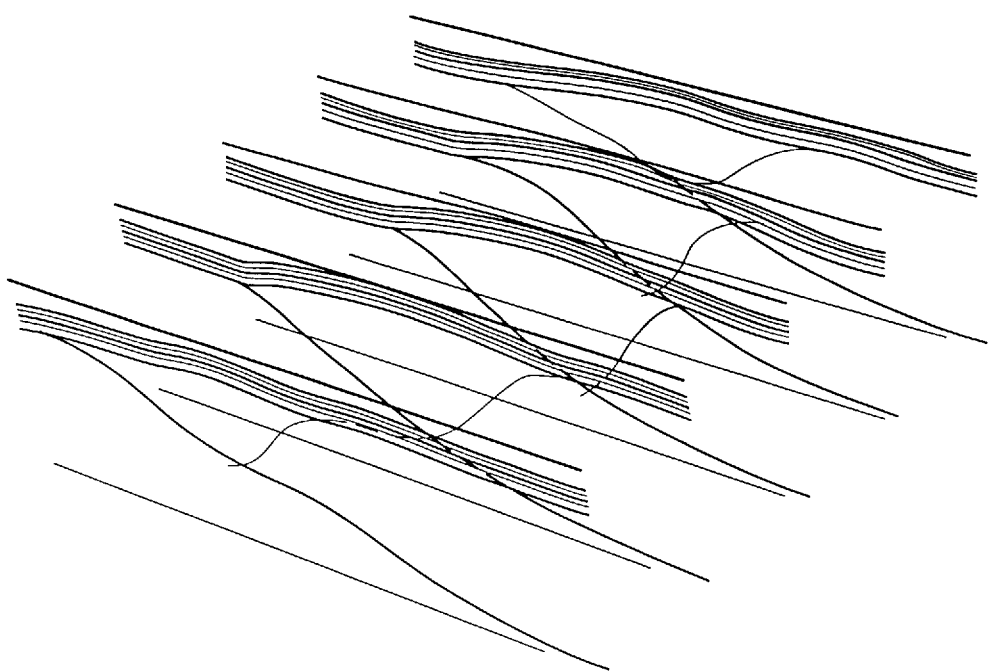
FIG. 7 shows curves taken from five profiles of a geologic structure of very large size, on which the method according to the invention was tested, which constitute part of the initial data available on this structure.
Figure 8:
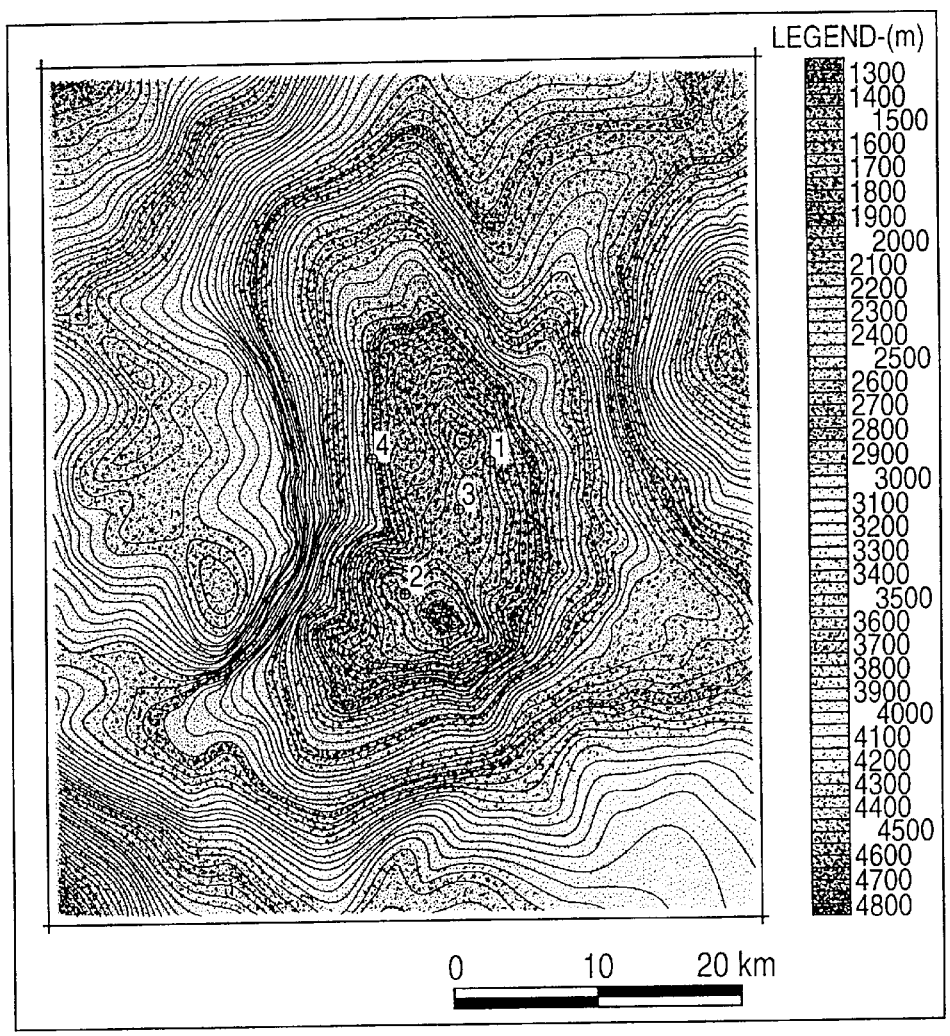
FIG. 8 shows other initial data on the same structure, in this case isobath maps and the locations of 4 wells.
Figure 9:
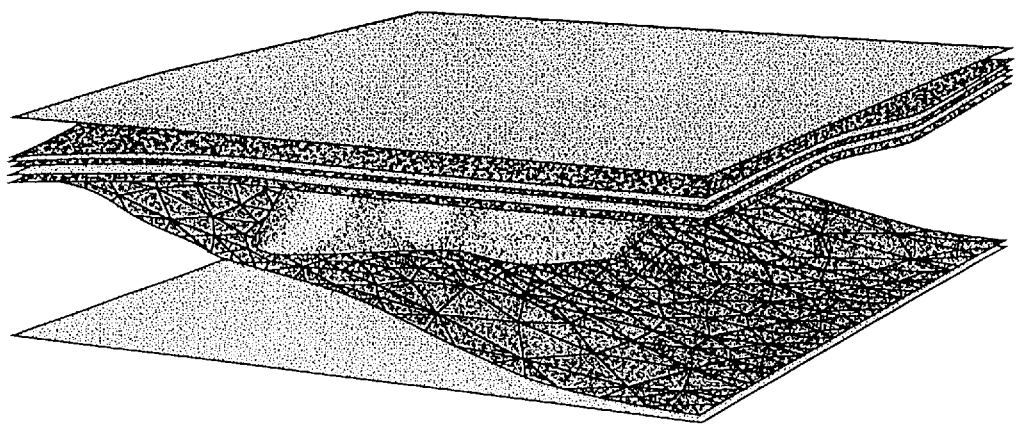
FIG. 9 shows a surface modeling (based on triangulated surfaces) of the geologic structure studied.

I - Modeling of the boundaries or edges of the zone studied and of the main discontinuities thereof The surfaces: edges, interfaces, faults, are modeled by using a well-known specialized software such as GOCAD (registered trademark) in the form of a continuous juxtaposition of triangular surface elements. At first, a rough shape matching as far as possible the initial data is achieved. The vertices of the surface are shifted iteratively by using an interpolation software and the triangular surface elements are locally densified so as to apply as closely as possible the surface onto the pattern of points (input data). The surface elements thus created generally do not join up as they should : the interfaces are not limited to the intersections and to the edge of the field of study and they may intersect while extending beyond. The lines of interception between surfaces are then calculated and the latter are limited to the intersection curves. FIG. 7 shows the final result of this modeling of the boundaries of the structure and it should be noted that most of the triangles of the triangulated surfaces of the pinchout are localized in areas of great curvature.

At this stage, it is not yet possible to produce a 3D grid pattern taking account of the geologic and numerical constraints. To that effect, the zone has to be split up.

II - Splitting up of the zone studied

The zone is first divided into macroblocks having at most six faces. These are generally blocks of hexahedral shape (six faces), but the number of faces can be less than six and brought down to two. In this case, for the purpose of the method, the block is still considered to be a hexahedral block but with degenerate faces (reduced to a point or to a curve). The splitting mode is generally suggested by the geometry of the horizons, of the main faults and their interaction. To form these 3D macroblocks, artificial boundaries are sometimes needed. This is necessary for example when a block has more than six natural faces and therefore does not satisfy the selected rule according to which it must be at most hexahedral. In such a case, two faces are gathered into a complex face to satisfy the criterion, or artificial cutting surfaces are introduced.

Figure 10:
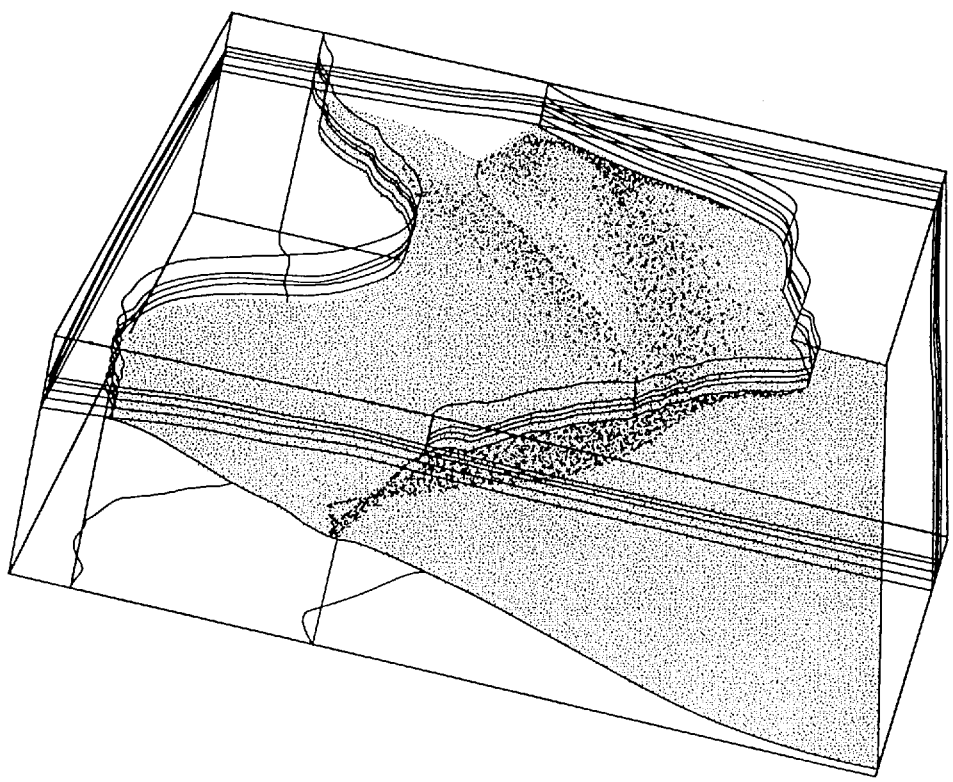
FIG. 10 shows an example of division of the structure into blocks.
Figure 11:
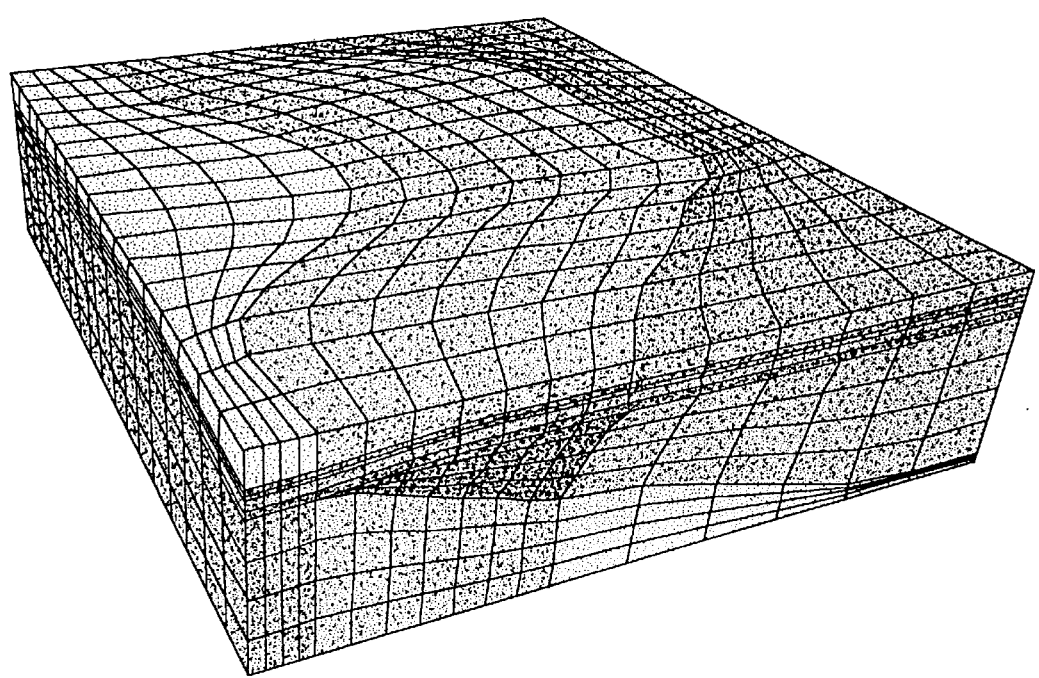
FIG. 11 shows the result of a block by block gridding of the external envelope of the geologic structure.
Figure 12:
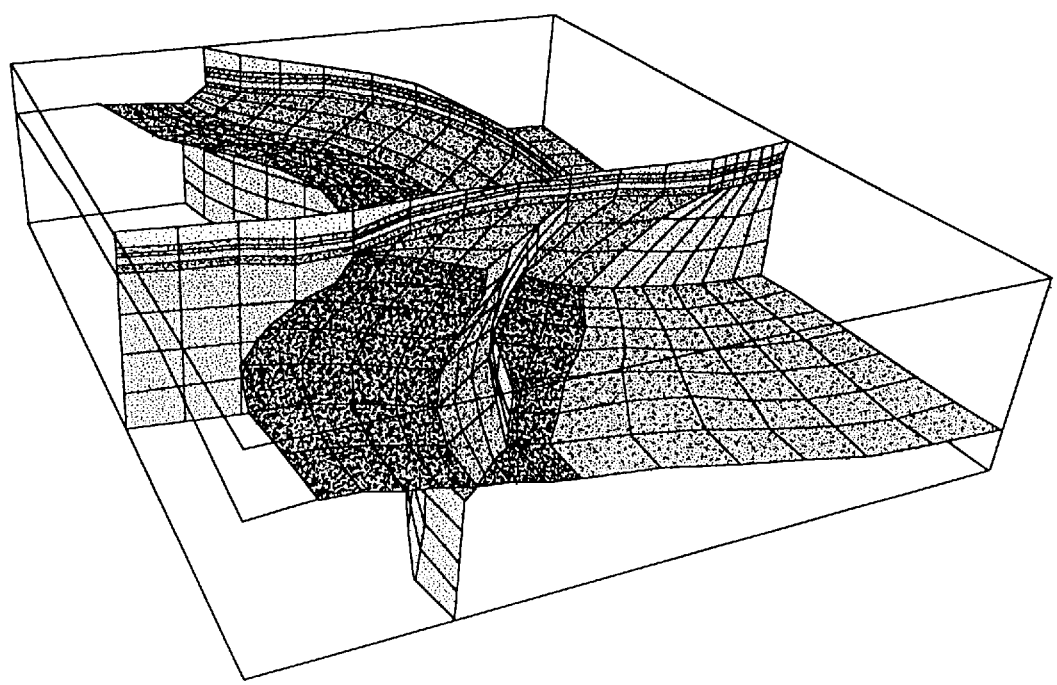
FIG. 12 shows the result of a block by block gridding of the internal surfaces of the geologic structure.
Figure 13:
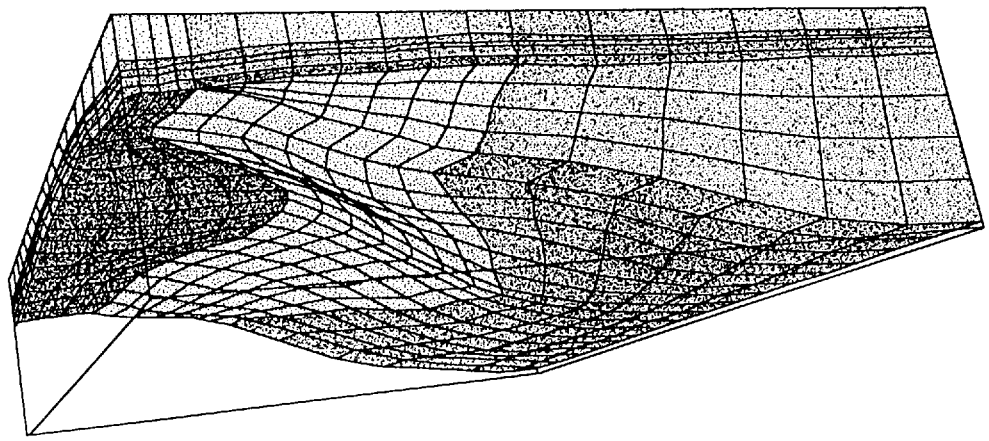
FIG. 13 illustrates by way of example how a pinchout is taken into account in the gridding of the geologic structure.
Figure 14:
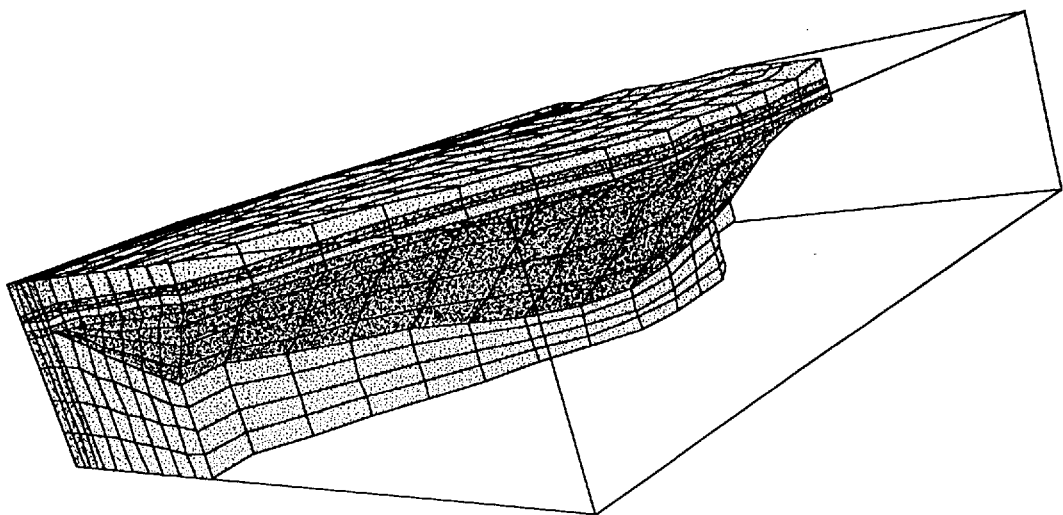
FIG. 14 illustrates by way of example how a fault is taken into account in the gridding of the geologic structure.

An example of splitting up the geologic structure studied in macroblocks is shown in FIG. 10, where the fault has been extrapolated up to the structure boundary and the intersection of the pinchout has been vertically projected onto the other surfaces.

III - Gridding

A 3D reticulation or gridding of each of these macroblocks is separately achieved so as to subdivide it into elementary blocks that will form the cells for the desired finite element modeling. This operation is achieved in two stages.

1) Gridding of the faces a) a grid is first created on each of the five or six faces of each macroblock. To that effect, an intermediate grid is formed by interpolation from the four edges of the face, by using Coons' transfinite interpolation method whose principle is described hereafter.

Figure 15:
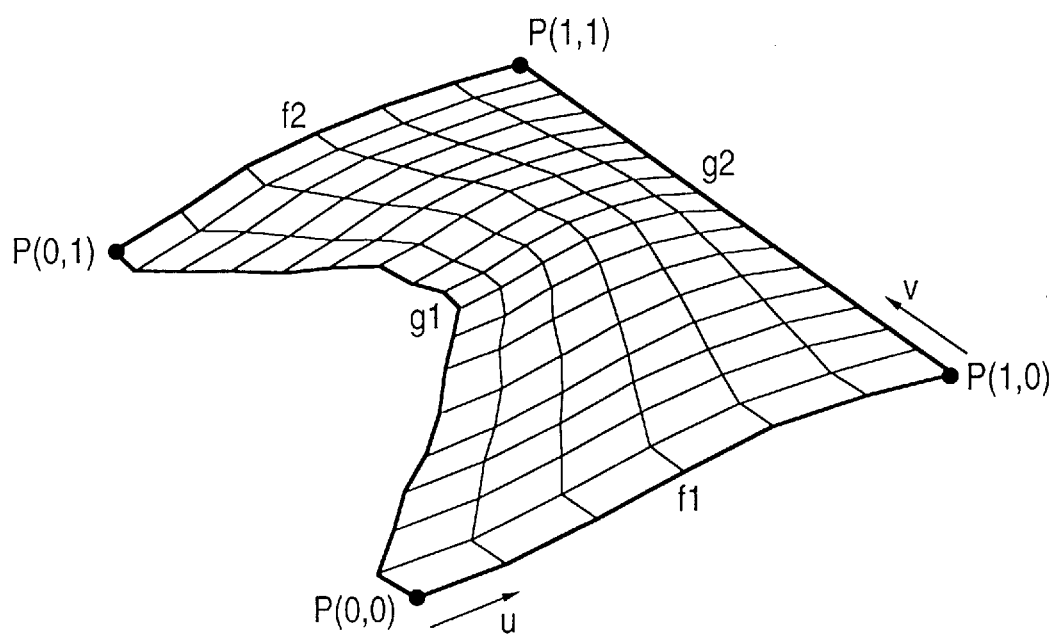
FIG. 15 illustrates Coons' 2D interpolation method.

Given four parametric curves $f1(u)$, $f2(u)$, $g1(v)$ and $g2(v)$ ($0 \leq u, v \leq 1$) defining four contiguous edges (FIG. 15), a formula is introduced to calculate the tightest surface passing through the four edges (that interpolates these edges):

$$S(u,v)=(1-u)g1(v)+ug2(v)+(1-v)f1(u)+vf2(u)-[(1-u)(1-v)P(0,0)+ (1-u)vP(0,1)+u(1-v)P(1,0)+uvP(1,1)] \quad (1)$$

Vertices $P(i,j)$ are the four corners of the surface.

A regular N×M gridding of this surface can then be obtained by simple sampling by taking as the vertices the points $S(i,j)$ corresponding to $ui=i/(N-1)$, $vj=j/(M-1)$, $i=0$ to $N-1$, $j=0$ to $M-1$. Formula 1 restricted to the grid points becomes $$S(i,j) = \left(1 - \frac{i}{N-1}\right) g1(j) + \frac{i}{N-1} g2(j) + \quad (2)$$

$$\left(1 - \frac{j}{M-1}\right) f1(i) + \frac{j}{M-1} f2(i) -$$

$$\left[\left(1 - \frac{i}{N-1}\right)\left(1 - \frac{j}{M-1}\right) P(0,0) + \right.$$

$$\left(1 - \frac{i}{N-1}\right) \frac{j}{M-1} P(0,1) +$$

$$\left. \frac{i}{N-1} \left(1 - \frac{j}{M-1}\right) P(1,0) + \frac{i}{N-1} \frac{j}{M-1} P(1,1) \right]$$

In the case illustrated, curves f1, f2, g1, g2 are obtained from the aforementioned software GOCAD and they are thus broken lines. In order to obtain a regular M×N gridding, curves f1 and f2 are regularly sampled (in curvilinear abscissa or segment length) in N points and curves g1, g2 in M points, then formula (2) is applied. It is also possible to obtain a gridding with a geometric progression in each direction, simply by imposing this constraint when resampling the curves.

Allowing for exceptions, this intermediate gridding is not suitable because there is no reason for it to coincide at this stage with the surface that has been previously triangulated by the surfacing software. The necessary adjustment consists in projecting the nodes of the intermediate grid onto the triangulated surface orthogonally to the latter, or in other directions, so as to obtain a new grid with nodes placed on the triangulated surface. When the four boundary curves are regularly sampled, Coons' interpolation method has the advantage of producing a regular grid insofar as all the segments sampled have the same length on each isoparametric curve. More generally, Coons' method preserves the size ratios between consecutive elements in a given direction. This allows for example to have regular grid patterns or grid patterns observing certain progressions in the size of the grids. However, the grid obtained by means of this well-known method loses its regularity (or the criterion sought) when projected onto the triangulated surface.

2) Rearrangement of the face nodes

In order to find the desired criterion in the distribution of the nodes of the projected grid, a satisfactory regularity for example, the nodes of the grid pattern have to be shifted on the triangulated surface. To that effect, a relaxation-projection of the grid is performed by means of successive adjustments as indicated hereafter (in cases where the criterion is regularity) in connection with FIGS. 1, 2.

Figure 17:
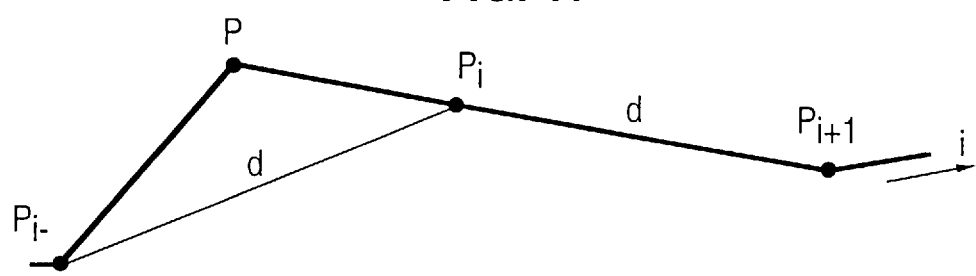
FIG. 17 illustrates the mode of relaxation-projection of the grid nodes.

Given a gridded block, the aim of this relaxation is to make its gridding as regular as possible, i.e. any isoparametric curve of the grid pattern is regularly sampled. To that effect, any point of the grid pattern is iteratively shifted so as to position it as much as possible at an equal distance from its two neighbours in each of the three neighbouring directions (u, v, w). Let P be the point to be shifted. For each direction i, (i=u, v, w) (FIG. 17), we find the point Pi that is at an equal distance from the two neighbours of P on the curve of direction i, (i=u, v, w). Point P is then replaced by the barycenter of the three points Pi (i=u, v, w).

After shifting all the points of the grid pattern in that way, the latter are no longer on the triangulated surface. They are then again projected onto the triangulated surface and the relaxation-projection process is repeated until the desired regularity is obtained.

Figure 1:
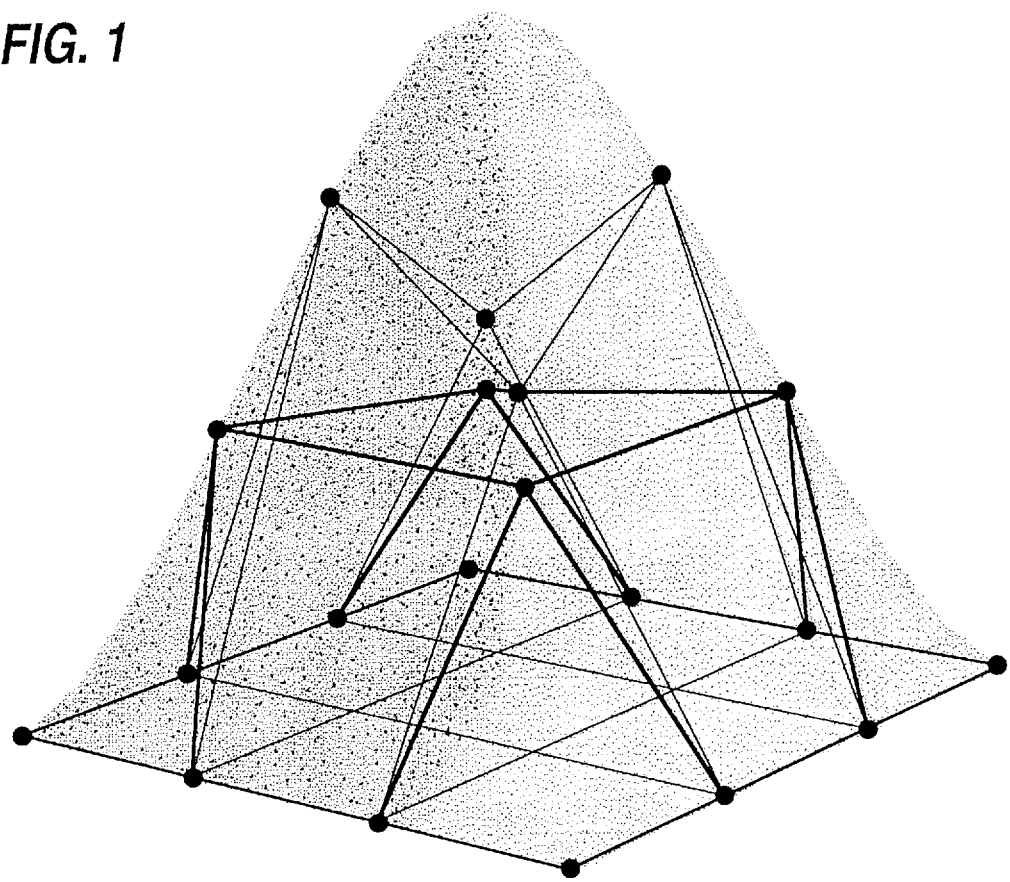
FIGS. 1 and 2 show examples of relaxation-projection on a 4×4 surface grid pattern.
Figure 2:
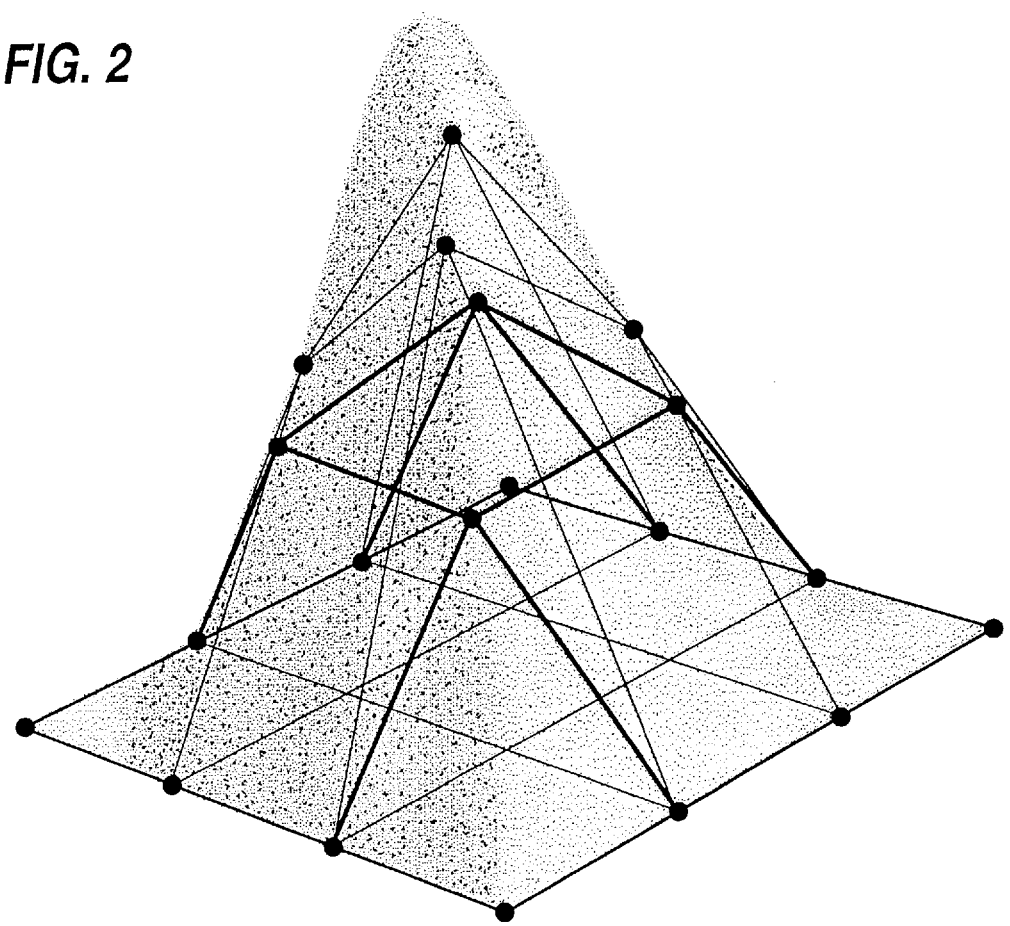
Figure 3:
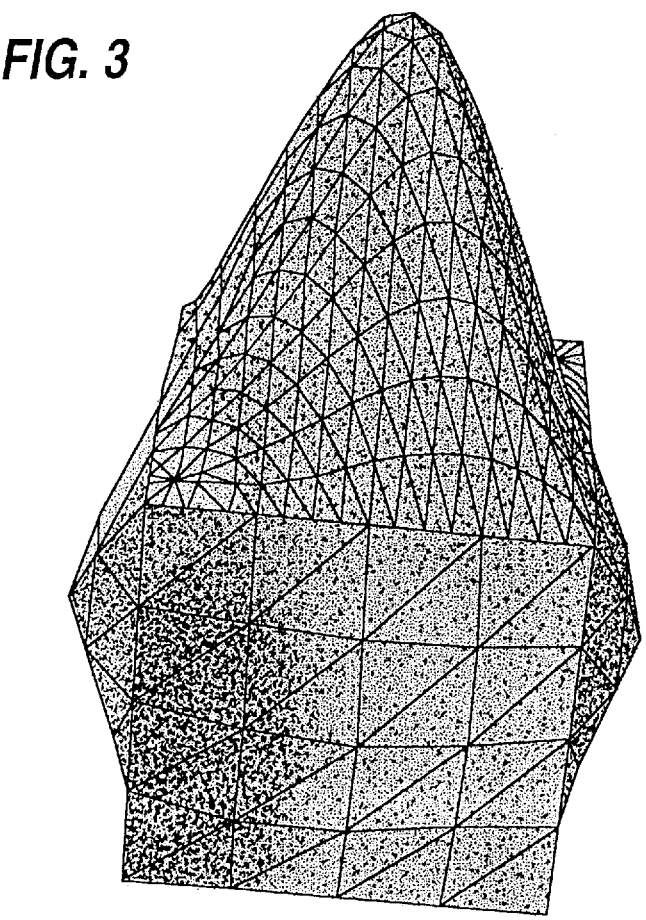
FIG. 3 shows a deformed cube with triangulated faces.
Figure 4:
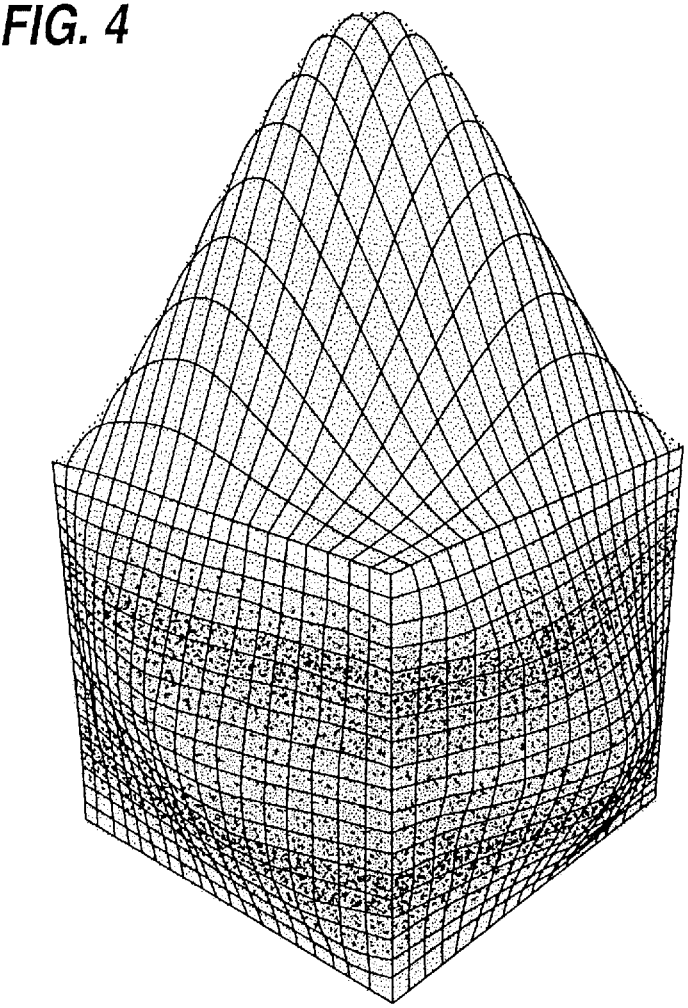
FIG. 4 shows the external envelope of a meshed cube.

This is illustrated by the example of FIGS. 1, 2 corresponding to a face of the deformed cube of FIG. 3, which is a synthetic example clearly illustrating the various stages of the method. This surface was obtained by simple deformation of a square face by preserving its edges (the edge of the surface remains a square). Three 4×4 grid patterns can be seen in these figures. The first one is a flat grid pattern resulting from the Coons' interpolation applied to the four edges (forming a square). The second is a fine grid pattern whose nodes are obtained by projection of those of the first grid pattern. It can be seen that this grid pattern has lost its regularity. The third is the regular grid pattern in thick line whose nodes are on the surface. It has been obtained from the second grid pattern after a series of projections and relaxations. FIG. 4 shows the result of these operations applied to all of the faces of the deformed cube.

3) Populating each block with grid nodes in the thickness thereof:

In order to extend in depth the grids formed on the faces of the blocks (FIG. 5), a volume generalization of the previous transfinite interpolation method is used.

Figure 16:
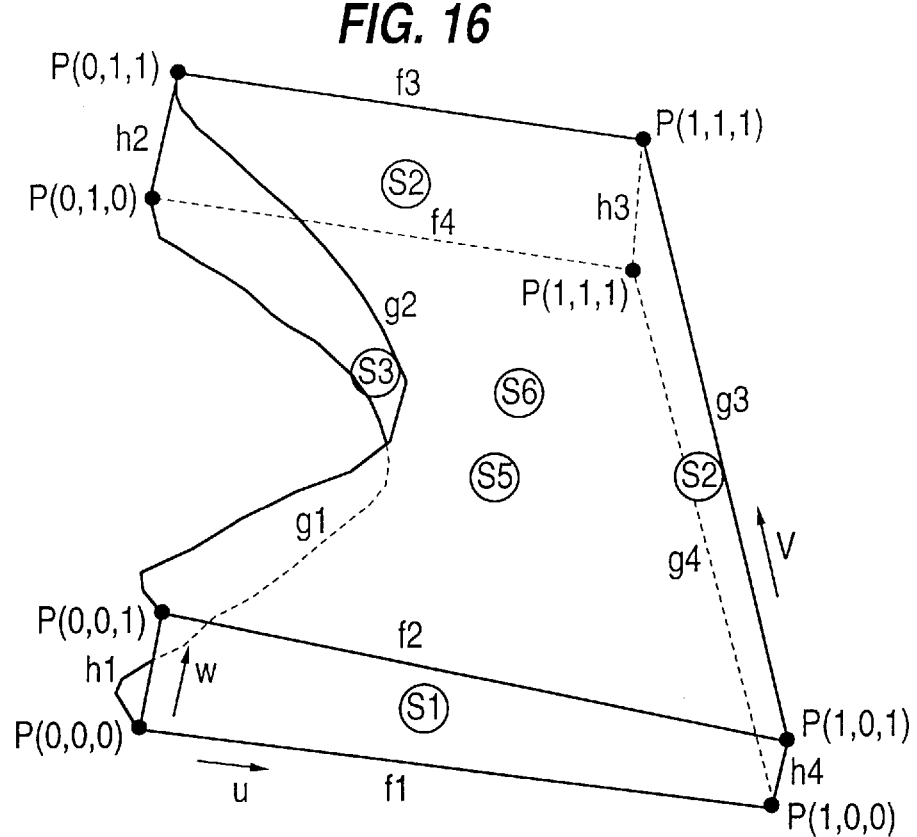
FIG. 16 shows the elements that are taken into account in Coons' 3D interpolation method.

Given 12 parametric curves f1(u), f2(u), f3(u), f4(u), g1(v), g2(v), g3(v), g4(v), h1(w), h2(w), h3(w), h4(w) ($0 \leq u$, v, w$\leq 1$) defining the 12 edges of a block such as that shown in FIG. 16, a generalization of Coons' formula provides a volume parametrization within the block. Coons' formula applied to volumes is as follows $$V(u, v, w) = (1 - v)(1 - w)f1(u) + (1 - v)wf2(u) + vwf3(u) + \quad (3)$$
$$v(1 - w)f4(u) + (1 - u)(1 - w)g1(v) + (1 - u)wg2(v) + uwg3(v) +$$
$$u(1 - w)g4(v) + (1 - u)(1 - v)h1(w) + (1 - u)vh2(w) +$$
$$uvh3(w) + u(1 - v)h4(v) + C(u, v, w)$$

with $$C(u, v, w) = -2[(1 - u)(1 - v)(1 - w)P(0, 0, 0) +$$
$$(1 - u)(1 - v)wP(0, 0, 1) + (1 - u)v(1 - w)P(0, 1, 0) +$$
$$(1 - u)vwp(0, 1, 1) + u(1 - v)(1 - w)P(1, 0, 0) +$$
$$u(1 - v)wP(1, 0, 1) + uv(1 - w)P(1, 1, 0) + uvwP(1, 1, 1)]$$

The vertices P(i,j,k) (i,j,k=0 or 1 in FIG. 16) are the 8 corners of the block.

Combining equations (1) and (3) leads to an expression of Coons' formula in the case of volumes as a function of the 6 edge surfaces of the block, S1(u,w), S2(u,w), S3(v,w), S4(v,w), S5(u,v), S6(u,v). But here the surfaces are also supposed to be obtained by Coons' interpolation from their edge curves. The formula is as follows $$V(u, v, w) = \frac{1}{2} [(1 - v)S1(u, w) + vS2(u, w) + (1 - u)S3(v, w) + \quad (4)$$
$$uS4(v, w) + (1 - w)S5(u, v) + wS6(u, v)] + \frac{1}{4} C(u, v, w)$$

Any sampling of V(u,v,w) then provides a EF gridding of the block.

This depth interpolation would give a regular distribution of the nodes if it was applied from the nodes of the grids formed on the various faces of the block. This is not the case and the distribution obtained is generally irregular because the depth interpolation method is applied to the nodes transferred by relaxation onto the triangulated surfaces, as described in stage 2 above.

4) Rearrangement of the block nodes

Figure 5:
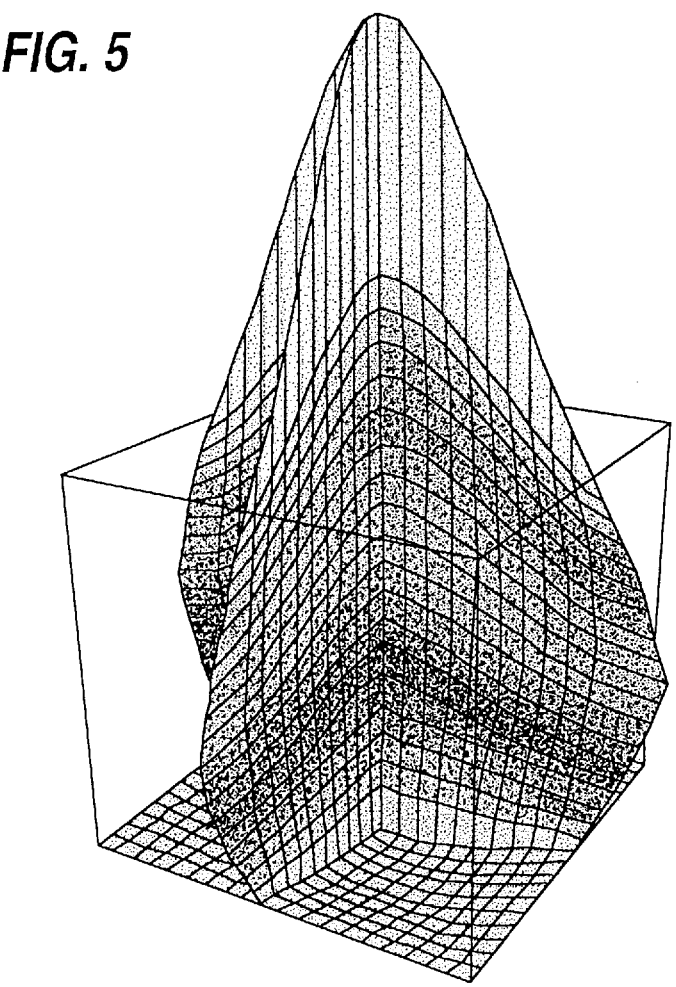
FIGS. 5 and 6 show the internal surfaces of a gridded cube respectively before and after relaxation.
Figure 6:
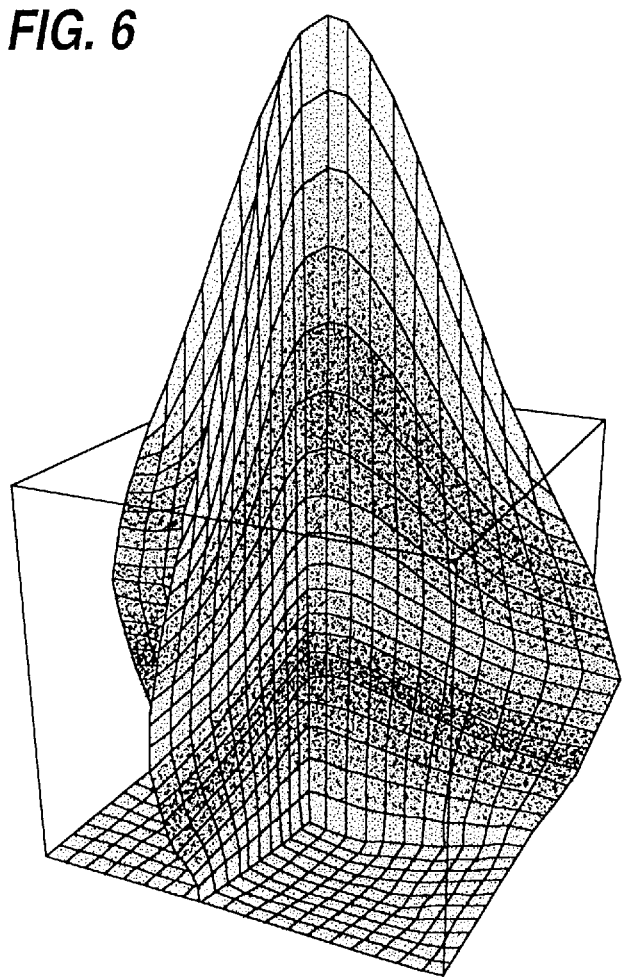

Thus, in order to recover a sufficient regularity (or to comply with another selected criterion), the method according to the invention also comprises a relaxation of the 3D grid as described above. FIGS. 5, 6 show the inner grid pattern of the deformed cube before and after relaxation. It can be noted that the grid pattern of FIG. 6 has a much higher regularity than the grid pattern of FIG. 5.

When each of the previous blocks of the structure studied has been properly gridded in volume, all these macroblocks are reassembled after the 3D reticulation thereof.

The method that has been described can be used for the gridding of various heterogeneities such as a channel or for the radial gridding of a deviated well.

Embodiments of the method applied to the gridding of a geologic structure have been described. However, without departing from the scope of the invention, the method can also be used for the gridding of any body or structure whose geometry is known and imposed a priori.

We claim:

1. A method for generating a 3D grid pattern in a volume of a structure of known and a priori imposed geometry defined from data acquired from seismic data or loggings performed in wells through the structure, in order to provide a model representative of the structure, including:

modelling boundaries of the volume by triangulated surfaces, enveloping as far as possible boundaries;

splitting up the volume into blocks having at most six faces, the faces corresponding to discontinuities or main faults of the volume;

generating an intermediate grid with quadrangular meshes between edges of each of the faces by interpolation between determined distributions of points sampled on the edges;

projecting nodes of the quadrangular meshes in a predetermined direction onto the triangulated surfaces, so as to generate face grids;

rearranging positions of the nodes of the face grids by a first relaxation of positions of the nodes according to a predetermined criteria;

populating each block with internal nodes positioned by interpolation between the nodes of the face grids so as to obtain an intermediate 3D grid with a determined distribution of the internal nodes in a volume of each block; and rearranging positions of the internal nodes by a second relaxation of the positions thereof according to a determined criteria.

2. A method as claimed in claim 1, wherein the first relaxation includes at least one relaxation-projection stage.

3. A method as claimed in claim 2, wherein the second relaxation includes at least one relaxation stage.

4. A method as claimed in claim 3, further comprising selecting the predetermined direction of projection as a direction perpendicular to each intermediate 3D grid.

5. A method as claimed in claim 3, further comprising using a transfinite type interpolation mode.

6. A method as claimed in claim 3, further comprising generating intermediate grids with regular grid patterns.

7. A method as claimed in claim 3, further comprising generating the intermediate grids so as to obtain a predetermined mode of progression of size.

8. A method as claimed in claim 3, further comprising reassembling all of the blocks.

9. A method as claimed in claim 2, further comprising selecting the predetermined direction of projection as a direction perpendicular to each intermediate 3D grid.

10. A method as claimed in claim 2, further comprising using a transfinite type interpolation mode.

11. A method as claimed in claim 2, further comprising generating intermediate grids with regular grid patterns.

12. A method as claimed in claim 2, further comprising generating the intermediate grids so as to obtain a predetermined mode of progression of size.

13. A method as claimed in claim 2, further comprising reassembling all of the blocks.

14. A method as claimed in claim 1, further comprising selecting the predetermined direction of projection as a direction perpendicular to each intermediate 3D grid.

15. A method as claimed in claim 1, further comprising using a transfinite type interpolation mode.

16. A method as claimed in claim 1, further comprising generating intermediate grids with regular grid patterns.

17. A method as claimed in claim 1, further comprising generating the intermediate grids so as to obtain a predetermined mode of progression of size.

18. A method as claimed in claim 1, further comprising reassembling all of the blocks.

* * * * *